I. HARTER, Jr.
STEAM BOILER.
APPLICATION FILED OCT. 13, 1915.
1,244,603. Patented Oct. 30, 1917.
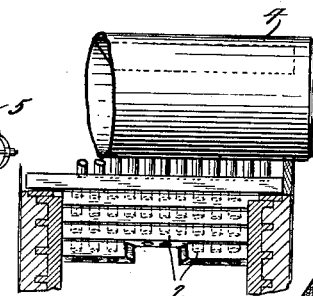
Fig. 2.
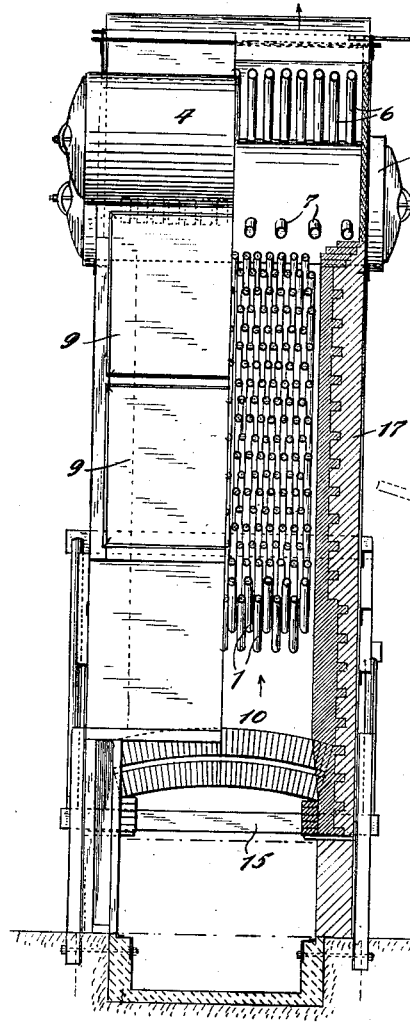
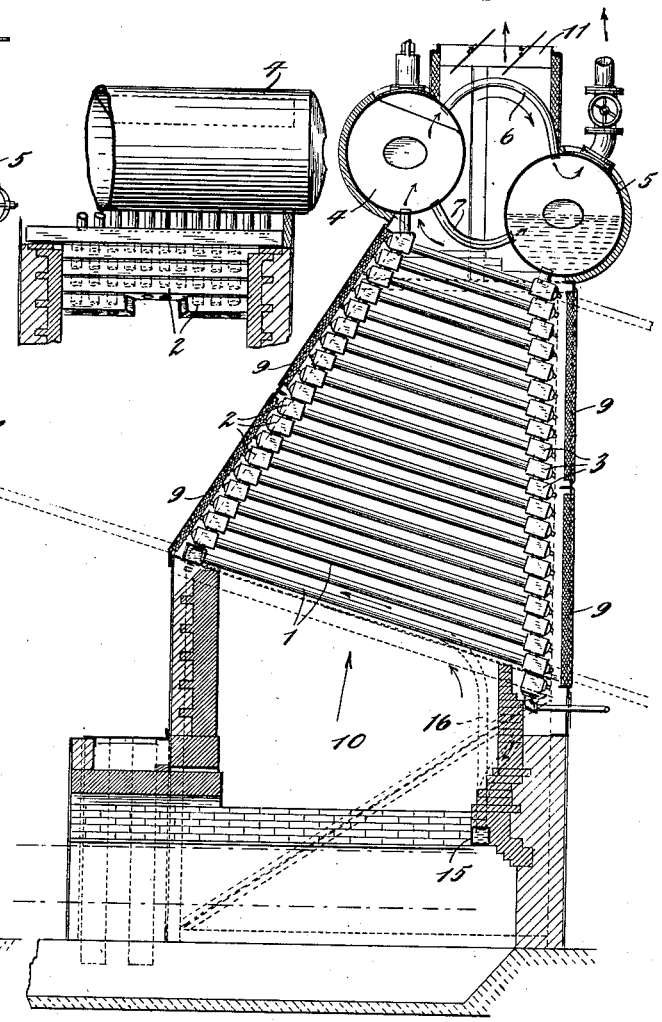
Fig. 3. Fig. 1.
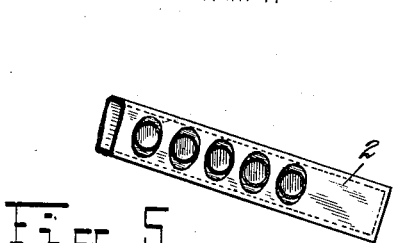
Fig. 5.
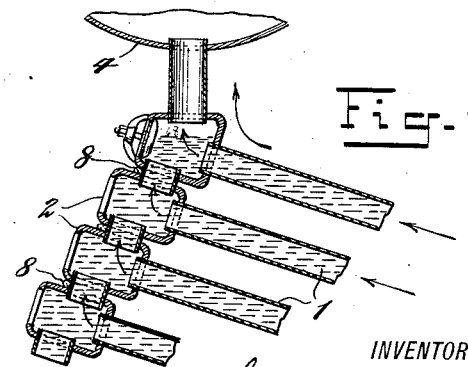
Fig. 4.
WITNESSES:
M. E. McNinch
J. McKrigan
INVENTOR
Isaac Harter Jr.
BY
Gifford Bull
his ATTORNEYS

UNITED STATES PATENT OFFICE.

ISAAC HARTER, JR., OF NEW YORK, N. Y., ASSIGNOR TO THE BABCOCK & WILCOX COMPANY, OF BAYONNE, NEW JERSEY, A CORPORATION OF NEW JERSEY.

STEAM-BOILER.

1,244,603.

Specification of Letters Patent.

Patented Oct. 30, 1917.

Application filed October 13, 1915. Serial No. 55,624.

*To all whom it may concern:*

Be it known that I, ISAAC HARTER, Jr., a citizen of the United States, residing at New York city, borough of Richmond, county of Richmond, and State of New York, have invented certain new and useful Improvements in Steam-Boilers, of which the following is a specification.

The efficiencies and capacities of steam boilers are dependent upon the quantity of gas passing through the boiler and the degree of its contact with the heating surface. The limiting elements in the matter of quantity are the cost and complication of high draft losses, and in order to get a satisfactory degree of contact between the heating surface and the gases it has been customary to use baffles.

In using such baffles to make the gases travel across or along the tubes the gases are made to change their path of travel, with the result that there is an additional draft loss due to the sudden changes in the direction of the flow of the gases. My invention eliminates losses due to these sudden changes in the direction of the path of the gases, and yet provides the means for producing and maintaining any desired velocity of the gases throughout the heating surface, and a highly uniform distribution over the heating surface, or through the flow space, so that a high absorptive efficiency can be secured and at the same time the saving of the draft loss due to the baffles can be applied to secure a greater capacity and a more uniform distribution of the gases.

In absorbing heat from the hot gases generated in a furnace there are two elements to be considered: first: the absorption of the radiant heat, and second: the absorption of the heat imparted to the gases. To effectively absorb the radiant heat a large amount of the surface should be exposed to the direct action of the fire. The elimination of the baffles leads to this result directly. To secure the best results in absorbing the heat imparted to the gases, which is effected through the conduction of the heat from the gases to the boiler tubes, the gases must impinge on the tubes with a proper velocity and all parts of the tube surface must be uniformly subjected to the gas flow.

It has been found that the heat transfer rate, or the amount of heat absorbed by conduction, is greater at a high velocity of the gases than at a low velocity. In an ordinary boiler, where the tube spacing, the distance between the tubes and the tube lengths are uniform throughout the boiler, the velocity of the gases is much lower on passing over the last tubes than it is on passing over the first tubes on account of the increase in density of the gases as they decrease in temperature. While it may be possible by baffle arrangement to approximate the high velocity conditions throughout the boiler that my invention secures, this can only be done with a draft loss which loss my invention reduces or eliminates. However, in boilers as constructed, it will be found that the velocity of the gases over the last tubes is actually much less than in the remainder of the boiler and consequently the heat absorption of the last tubes is considerably handicapped.

In my invention I arrange the boiler tubes so that the area for the passage of the gases at successive rows of tubes decreases as the gas flows through the boiler and in this way I maintain a velocity of the gases over the tube surface which leads to the best commercial efficiency when the draft loss and capacity obtainable are considered. By reason of this successive decrease in area there is a small increment of draft loss with each successive reduction and this small increment causes the gases to spread out uniformly over the whole heating surface, or through the flow space, and avoids any tendency to the laning action of the gases.

In my invention the travel of the gases through the boiler is in the same general direction, and with no return of the gases to and over a portion of the same tubes, and in addition to saving the draft loss that is required to make the turns in an ordinary boiler there is an additional gain from the fact that in an ordinary boiler at the point where these turns take place there is a tendency to divert the gases from the surface adjacent to this point.

The invention will be understood by reference to the accompanying drawings, in which Figure 1 is a sectional side elevation of one form of boiler embodying the invention; Fig. 2 a half front view and half cross section of Fig. 1; and Figs. 3, 4 and 5, enlarged details of Figs. 1 and 2.

Similar reference numerals indicate similar parts in the several views.

In this, and in a companion application, filed of even date herewith, I have indicated three general methods of securing the desired result, all, however, embodying the common idea of decreasing the area for the flow of the gases with no return of the gases over a portion of the same tubes. These general methods are (1) by using tubes of different lengths in successive rows, with the maximum lengths nearest the source of heat. The tubes therefore may be, and preferably are, spaced the same distance apart in the successive rows, and the same diameter, and the rows preferably have the same number of tubes in each row; (2) by decreasing the space between the inclosing walls which extend lengthwise of the tubes and correspondingly decreasing the number of tubes in the successive rows. I may, and preferably do, use tubes of the same length and diameter and space them the same distance apart. (3) by maintaining substantially the same cross-sectional area between the walls of the setting and increasing the number of tubes in successive rows. In this case I preferably use tubes of the same diameter.

In the present application I have illustrated a construction of boiler in conformity with the first method above referred to. In the particular construction illustrated the numeral 1 designates a bank of inclined generating tubes expanded into front and rear header boxes 2 and 3. Each horizontal row contains the same number of tubes but the lengths of tubes decrease from the lowermost to the uppermost row, as indicated in Fig. 1, so that the rear or downtake header boxes are in substantially vertical alinement and the front or up-take header boxes are offset toward the inside of the boiler to reduce the lengths of the tubes. The boxes 2 are nippled to each other, as shown in Fig. 4, and the uppermost box is nippled to a cross drum 4. The boxes 3 are nippled to each other and the uppermost one is nippled to a cross drum 5 at a slightly lower level than the drum 4. These drums are connected by pipes 6 and 7, the former serving as pressure equalizers and steam driers and the latter to return any water from drum 4 to drum 5. Access may be had to the header boxes 2 and 3 for removing or replacing tubes, and for cleaning the interior of the tubes through hand hole openings, shown in Figs. 4 and 5; these holes being normally closed by covers, as shown in Fig. 1. Asbestos ropes 8 close the spaces between the header boxes, and cleaning of the exterior of the tubes can be done by opening doors 9 and temporarily removing the asbestos ropes.

The bank of tubes is placed directly above the main combustion chamber 10, so that the first tubes are exposed to the direct action of the fire. As baffles are not employed the gases have an unobstructed flow across the tubes, the uptake being shown at 11.

By reason of the shortening of the tube lengths the space for the flow of the gases from the combustion chamber to the uptake is confined between the rear and front doors 9 and the side walls 17 of the setting, the front doors being inclined as indicated in Fig. 1 to conform to the general inclination of the plane of the front header boxes, so that a vertical longitudinal section through the boiler shows the front thereof inclining toward the rear. This gradual reduction in the gas passage area within the confines of the front and rear doors and the side walls results in less reduction in the velocity of the gases as their temperature decreases than could occur with a gas passage of uniform area.

The furnace may be arranged, as shown, with a chain grate stoker having a rear water box 15 connected with the circulation by tubes 16, but the particular method of firing is not an essential part of the invention.

In the boiler herein illustrated and described a large amount of heating surface is exposed to the radiant heat of the fire, thus absorbing a greater amount of heat by direct radiation than would be absorbed when only a portion of the tubes is thus exposed. By presenting a large amount of heating surface to the direct action of the fire there is an advantage through minimizing the expense of maintenance of brick-work by reducing the temperature of the furnace. In certain instances a reduction of furnace temperature makes it possible to burn fuels which would give trouble through fusing the ash with higher furnace temperatures, and in such cases a large amount of the boiler surface exposed to the radiant heat is of especial advantage. Where the furnace temperature is such that the ash of the coal is fused, the fire with certain grades of coal will become more or less impervious to air, and in some instances the rate of combustion will be so low through this cause that the proper degree of capacity cannot be obtained from the boiler. In my arrangement this difficulty is overcome by reducing the furnace temperature, and it is possible to burn fuels which would give trouble with some other arrangements.

Another advantage of my arrangement is, that in cleaning the dust from the outside of the tubes, which is usually accomplished by means of an air or steam lance with the boiler in operation, the dust will be carried well away from the setting, as the velocity of the gases may be maintained at a point where the dust will be carried along with the gases as they flow through the boiler.

I have described in this application one method to effect the decrease of the area for the flow of the gases, so as to maintain any desired velocity of the gases. This velocity may be maintained substantially constant, if desired. In some cases good results would be secured by maintaining a nearly equal and high speed of the gases over the greater part of the boiler and arranging the tubes which come nearest the fire with a wider spacing as shown in Fig. 2. The tubes nearest the fire may be so spaced as to effect an advantageous action through making it possible to more completely burn the combustible elements from the gases before they finally leave the boiler. With most furnaces the combustion is not completed before the gases strike the tubes and the elements have been traveling a considerable distance between and around the tubes. When the temperature of the gases is reduced to a certain degree combustion cannot be maintained and smoke or waste through discharging combustible gases along with the flue gases will result. With the distance between the tubes which exists in a boiler of ordinary construction the gases passing between the tubes will often be cooled to such an extent before all the combustible elements are consumed that combustion is no longer possible and smoke and loss of efficiency will result. In my invention the boiler tubes which come nearest the fire may be placed so far apart that they serve the function of mingling the unburned combustible gases, and by properly arranging the spacing from the lowermost tubes upward, it is possible to burn the combustible elements from the gases before the temperature of the gases is reduced below the point where combustion necessarily ceases. An additional advantage of the wider spaced tubes at the lower part of the bank is that with a given capacity the heat transfer rate, due to the lower velocity of the gases, will be less than with more narrow spaces and the tubes will have a longer life.

It is not necessary that the increase of velocity bear an exact ratio to the decrease in the area at each successive row of tubes. It is to be understood that I do not limit myself to the exact number of tubes in each row, as shown in the drawings, the latter serving simply to explain the principle upon which the invention is based.

What I claim and desire to secure by Letters Patent of the United States is:—

A boiler comprising a bank of substantially parallel tubes arranged in rows at substantially equal distances apart, the tubes of a given row being staggered with respect to the tubes of adjacent rows, the length of the tubes of a given row being the same and the lengths of the tubes of successive rows from the furnace toward the gas outlet decreasing, headers to which the ends of the tubes are connected, drums connected to said headers, a furnace discharging between the longer tubes, and a setting which, with the above arrangement of tubes, causes the gases to flow through the boiler in one direction through regularly decreasing flow areas.

In testimony whereof I have hereunto signed my name in the presence of two subscribing witnesses.

ISAAC HARTER, JR.

Witnesses:
JOHN H. CRONAN,
EDWARD A. BANNON.